United States Patent [19]

Fox et al.

[11] Patent Number: 5,107,077

[45] Date of Patent: * Apr. 21, 1992

[54] WATERPROOF ELECTRICAL SPLICE ENCLOSURE AND SPLICE, AND METHOD FOR WATERPROOFING AN ELECTRICAL CONNECTION

[75] Inventors: Albert H. Fox, Oakdale; Ronald C. Johansson, St. Paul, both of Minn.

[73] Assignee: Minnesota Mining and Manufacturing Co., St. Paul, Minn.

[*] Notice: The portion of the term of this patent subsequent to Jun. 13, 2006 has been disclaimed.

[21] Appl. No.: 333,277

[22] Filed: Apr. 5, 1989

Related U.S. Application Data

[62] Division of Ser. No. 910,480, Sep. 23, 1986, Pat. No. 4,839,423.

[51] Int. Cl.⁵ ............................................. H01B 17/00
[52] U.S. Cl. ................................. 174/138 F; 174/76; 439/367; 439/521
[58] Field of Search ............. 174/76, 87, 138 F, 74 A; 439/367, 519, 521, 892, 522, 523, 936; 220/339; 206/205, 206

[56] References Cited

U.S. PATENT DOCUMENTS

| | | | |
|---|---|---|---|
| 2,792,444 | 5/1957 | Bergan | 174/87 |
| 2,906,810 | 9/1959 | D'Ascoli | 174/87 |
| 2,965,700 | 12/1960 | Kusiv | 174/87 |
| 3,523,607 | 8/1970 | Gillemot et al. | 174/76 X |
| 3,585,275 | 6/1971 | Gillemot et al. | 174/76 |
| 3,597,528 | 8/1971 | Penfield et al. | 174/87 |
| 3,897,129 | 7/1975 | Farrar, Jr. | 174/138 F X |
| 3,934,076 | 1/1976 | Smith | 174/87 |
| 4,039,742 | 8/1977 | Smith | 174/87 |
| 4,053,704 | 10/1977 | Smith | 174/87 |
| 4,070,543 | 1/1978 | Thompson et al. | 174/87 |
| 4,647,717 | 3/1987 | Uken | 174/76 X |
| 4,713,219 | 12/1987 | Gerken et al. | 220/339 X |
| 4,721,832 | 1/1988 | Toy | 174/76 X |

FOREIGN PATENT DOCUMENTS

| | | | |
|---|---|---|---|
| 557587 | 5/1958 | Canada | 174/138 F |
| 568195 | 12/1958 | Canada | 174/87 |
| 1935546 | 1/1971 | Fed. Rep. of Germany | 439/523 |
| 1950457 | 4/1971 | Fed. Rep. of Germany | 174/138 F |
| 246327 | 1/1926 | United Kingdom | 174/87 |

Primary Examiner—Gerald P. Tolin
Assistant Examiner—Trinidad Korka
Attorney, Agent, or Firm—Gary L. Griswold; Walter N. Kirn; David W. Anderson

[57] ABSTRACT

A waterproof electrical splice enclosure for receiving a single electrical connector splicing the ends of a plurality of insulated electrical conductors extending out of the connector in the same same direction and parallel to one another. The enclosure comprises an elongated hollow tube having one open end and one closed end having a cross-section slightly larger than the connector. A connector retainer is provided to retain the electrical connector adjacent the closed end of the tube with the insulated electrical conductors extending out of the open end of the tube, and the tube contains a waterproofing fluid which will not flow out of the tube but which will flow around the connector as it is slid into the tube to provide a waterproof seal around the connector and around and between the insulated conductors. A cap is connected to the tube at its open end by a hinge and has a bulbous protrusion to fit into and close the open end of the tube, and a latch retains the cap in the closed position.

44 Claims, 2 Drawing Sheets

WATERPROOF ELECTRICAL SPLICE ENCLOSURE AND SPLICE, AND METHOD FOR WATERPROOFING AN ELECTRICAL CONNECTION

This is a division of application Ser. No. 06/910,480 filed Sep. 23, 1986, now U.S. Pat. No. 4,839,473.

FIELD OF THE INVENTION

The present invention relates to a waterproof electrical splice enclosure for a single electrical connector splicing the ends of a plurality of insulated electrical conductors.

BACKGROUND OF THE INVENTION

At locations where insulated electrical conductors are to be electrically connected together, the insulation must be cut through, thereby disrupting the waterproofing provided by the insulation. One common method of connecting the conductors is to strip back the insulation from the ends of the conductors and to electrically connect the bared conductors together in a twist-on electrical connector. If the electrical connection is to be used in a location where it is exposed to water, for example by being buried in the ground, waterproofing must be provided around the connection. Many different types of waterproof electrical splice enclosures of varying complexity have been developed for this purpose as disclosed in U.S. Pat. Nos. 2,906,810; 3,523,607; 3,585,275; 3,934,076; 3,597,528; 4,039,742; 4,053,704; and 4,070,543.

SUMMARY OF THE INVENTION

The present invention provides a waterproof electrical splice enclosure for receiving a single electrical connector splicing the ends of a plurality of insulated electrical conductors extending out of the connector in the same direction and parallel to one another. The enclosure comprises an elongate hollow tube having one open end and one closed end, the cross-sectional dimensions of the hollow space within the tube in a plane perpendicular to its length being slightly greater than the cross-sectional dimensions of the electrical connector in a plane perpendicular to the length of the insulated electrical conductors extending out of the connector. Means are provided for retaining the electrical connector at a connector retention position adjacent the closed end of the tube with the insulated electrical conductors extending from the connector out of the open end of the tube. A waterproofing fluid is within the tube, the waterproofing fluid under normal conditions of use having a sufficient viscosity so that it will not flow out of the tube, but being capable of flowing around the connector as it is slid into the tube to the connector retention position adjacent the closed end of the tube to fill the space around the connector and around and between the insulated conductors extending out of the tube to provide a waterproof seal around the connector and the spliced ends of the insulated conductors.

The invention also includes a single electrical connector together with the waterproof electrical splice enclosure described above. And, it includes the combination of a plurality of insulated electrical conductors spliced by a single electrical connector and the waterproof electrical splice enclosure.

THE DRAWING

DESCRIPTION OF THE PREFERRED EMBODIMENT

Figure 1:
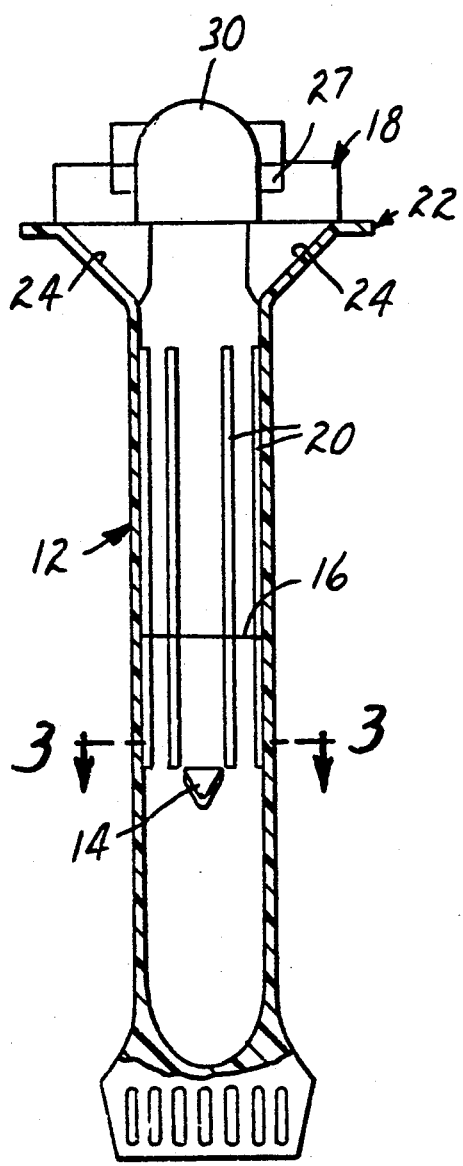
FIG. 1 is an elevation view of a waterproof electrical splice enclosure constructed in accordance with the present invention sectioned longitudinally approximately midway of its diameter to illustrate the interior of the enclosure.
Figure 3:
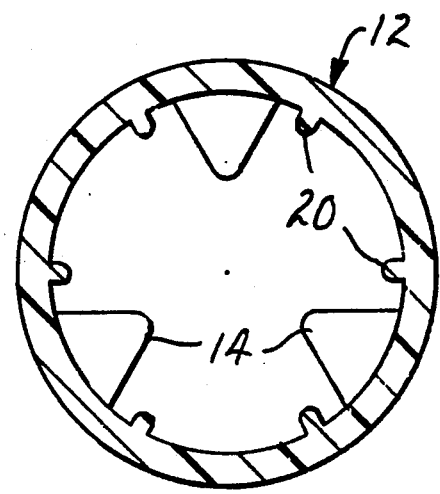
FIG. 3 is a cross-sectional view along line 3—3 of FIG. 1.
Figure 2:
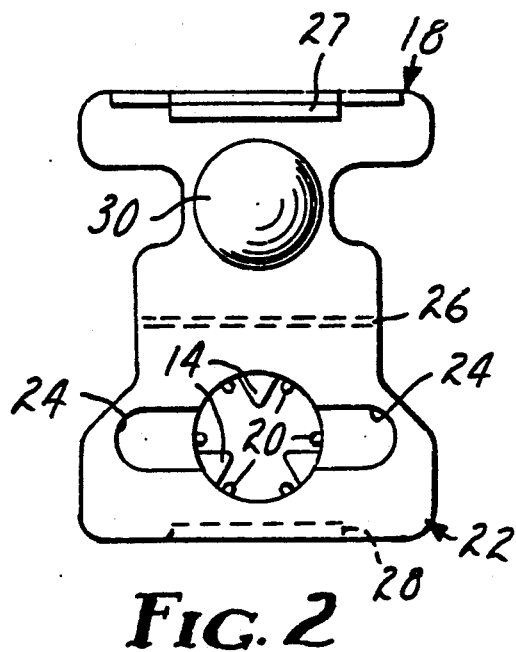
FIG. 2 is a top view of the splice enclosure of FIG. 1.

The waterproof electrical splice enclosure of the present invention is constructed for receiving an electrical connector 10 splicing the ends of a plurality of insulated electrical conductors 11 extending out of the connector in the same direction and parallel to one another. The illustrated electrical connector 10 is of the type that has an insulative outer shell within which is a metal coupler that threads onto the bared ends of the electrical conductors to electrically splice them together.

The splice enclosure includes an elongate hollow tube 12 having one open end and one closed end, three connector retaining fingers 14 for retaining the electrical connector at a connector retention position adjacent the closed end of the tube 12, and a waterproofing fluid 16 within the tube. The splice enclosure, with the exception of the waterproofing fluid 16, is a one-piece plastic molding which includes a cap 18 for closing the open end of the tube 12. The preferred plastic is polypropylene. The closed end of the tube is molded in an open condition and is closed by ultrasonic welding.

The cross-sectional dimensions of the hollow spaced within the tube 12 in a plane perpendicular to its length are slightly greater than the cross-sectional dimensions of the electrical connector 10 in a plane perpendicular to the length of the insulated conductors 11 extending out of the connector. The dimensions are large enough to permit the connector and wires to be slid down into the tube but small enough to cause the connector and insulated conductors to displace a substantial proportion of the waterproofing fluid 16 to force the waterproofing fluid 16 to flow around the connector 10 and insulated conductors and fill the space around the connector and around and between the insulated electrical conductors 11. In the illustrated embodiment the tube 12 is cylindrical to accommodate the generally cylindrical connector 10. Six longitudinal ribs 20 are formed on the interior wall of the tube 12 and are spaced equally around the tube to center the connector 10 as it is slid into the tube 12 to aid in causing the waterproofing fluid 16 to flow around the entire connector as it is slid into the tube.

The three connector retaining fingers 14 are equally spaced around the tube and extend from the interior wall of the tube 12 into the hollow spaced within the tube. The connector retaining fingers are spaced from the closed end of the tube a distance slightly greater than the length of the connector 10 parallel to the insulated electrical conductors 11 to permit the electrical connector to be slid down the tube 12 past the fingers 14, the fingers being formed to be resiliently depressed by the connector and to resiliently spring back after the connector is slid past them and retain the connector in the closed end of the tube. To aid in accomplishing this, the connector retaining fingers 14 are inclined to the wall of the tube 12 converging toward the closed end of the tube.

The open end of the tube 12 is formed with a broadened entrance area 22 which has two opposed insulated conductor receiving channels 24 converging into the open end of the tube 12.

Figure 8:
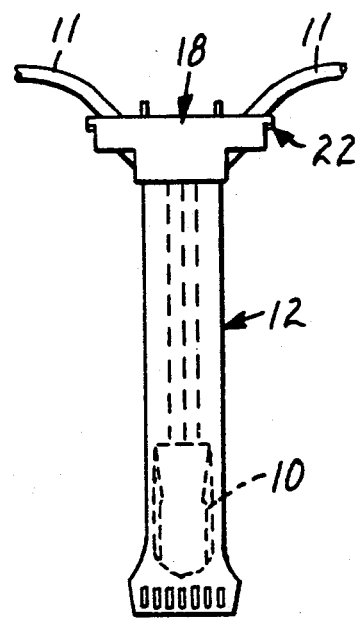
FIG. 8 is a front elevation view like that of FIG. 7 without any sectioning of the splice enclosure.
Figure 4:
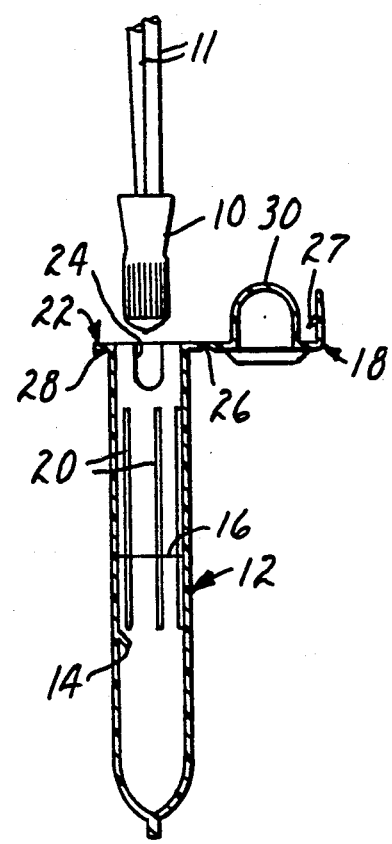
FIG. 4 is a partially sectioned side elevation view of the enclosure with an electrical connector splicing a pair of insulated electrical conductors in position to be inserted into the splice enclosure.
Figure 5:
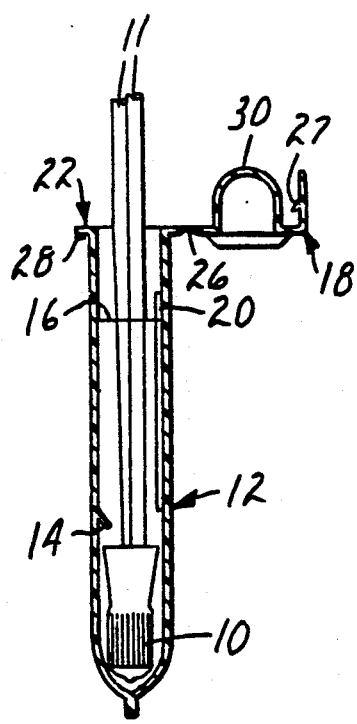
FIG. 5 is a view similar to that of FIG. 4 with the electrical connector inserted fully into the splice enclosure.
Figure 6:
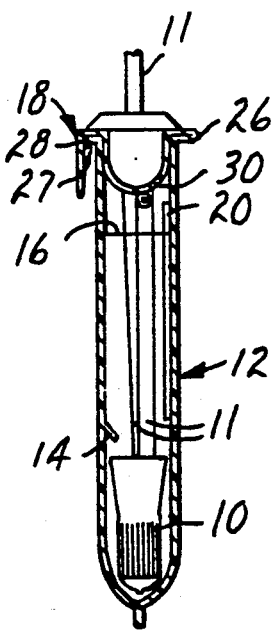
FIG. 6 is a view similar to that of FIG. 5 with the cap of the enclosure closed.
Figure 7:
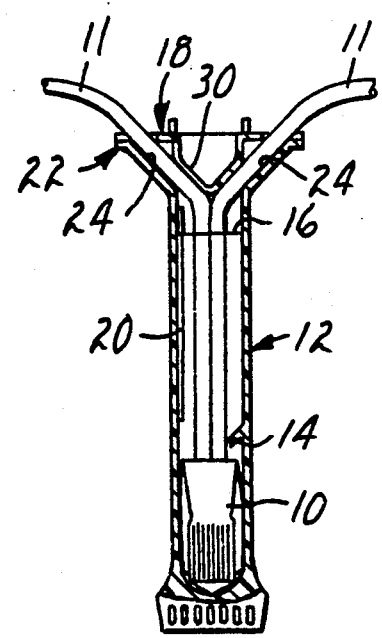
FIG. 7 is a front elevation view partially in section with the connector and wires inserted into the enclosure as in FIG. 6.

The cap 18 is connected to the tube 12 by a hinge area 26 permitting the cap to be pivoted to the closed position closing the open end of the tube 12 as illustrated in FIGS. 6 through 8. The cap 18 is formed with a latching projection 27 and a complementary latching shoulder 28 is formed on the opposite edge of the broadened entrance area 22 to latch the cap in its closed position. The cap 18 is also formed with a bulbous protrusion 30 to fit into and generally fill the open end of the tube 12. The bulbous protrusion 30 is deformable by the insulated conductors 11, as illustrated in FIG. 7, to firmly press the insulated conductors 11 into the insulated conductor receiving channels 24, thereby to strain relieve the connection.

The waterproofing fluid 16 under normal conditions of use has a sufficient viscosity so that it will not flow out of the tube 12 but at the same time being capable of flowing around the connector 10 as it is slid into the tube to the connector retention position adjacent the closed end of the tube to fill the space around the connector and around and between the insulated conductors 11 extending out of the connector to provide a waterproof seal around the connector and the spliced ends of the insulated conductors. As used herein, "normal conditions of use" is intended to mean the environmental conditions and the state of the waterproofing fluid at the time the electrical connector 10 containing the ends of the insulated electrical connectors 11 spliced therein is to be inserted into the splice enclosure. The presently preferred waterproofing fluid is an azlactone gel formed by crosslinking an azlactone compound with a crosslinking agent, preferably a polyol, polythiol or polyamine and plasticizing the reaction product with an organic plasticizer material which is essentially inert to the azlactone/crosslinking agent reaction and which has the ability to become and remain blended with the reaction product of the azlactone compound and the crosslinking agent; specifically the azlactone gel disclosed in example 1 of U.S. patent application Ser. No. 910,528, filed on Sep. 23, 1986.

If the insulated conductors 11 are sufficiently stiff to permit the worker to grasp them at a point spaced from the electrical connector 10 and push on them to slide the connector into and down the tube 12 into the waterproofing fluid, as illustrated in the drawings, the forcible engagement of the insulated conductors between the bulbous protrusion 30 and the insulated conductor receiving channels 24 provides means for retaining the connector in the connector retention position adjacent the closed end of the tube. However, it is desirable to also have the connector retaining fingers 14 because they positively prevent the connector 10 from being pulled back after it is fully inserted into the tube and before the cap is closed, since with some waterproofing fluids pulling back of the connector may open a path through the waterproofing fluid to the connector. If the insulated conductors are not sufficiently stiff to push with, a separate connector pusher may be provided and it may remain in the tube 12 and comprise the mean for retaining the connector adjacent the closed end of the tube.

We claim:

1. A waterproof electrical splice enclosure for receiving a single electrical connector splicing the ends of a plurality of insulated electrical conductors extending out of the connector in the same direction and parallel to one another, comprising:

an elongate hollow tube having one open end and one closed end, the cross-sectional dimensions of the hollow space within said tube in a plane perpendicular to its length being constant along a majority of the length of said tube and only slightly greater than the cross-sectional dimensions of the electrical connector in a plane perpendicular to the length of the insulated electrical conductors extending out of the connector, means for retaining the electrical connector at a connector retention position adjacent said closed end of said tube with the insulated electrical conductors extending from the connector out of said open end of said tube, and a waterproofing fluid within said tube, said waterproofing fluid under normal conditions of use having a sufficient viscosity so that it will not flow out of said tube but being capable of flowing around the connector as it is slid into said tube to said connector retention position adjacent said closed end of said tube to fill the space around the connector and around and between the insulated conductors extending out of the connector to provide a waterproof seal around the connector and the spliced ends of the insulated conductors, the length of said hollow space of constant cross-sectional dimensions within said elongate hollow tube being sufficiently greater than the length of the electrical connector to provide a confined space sufficiently long to force said waterproofing fluid to flow around the connector and around and between the insulated conductors as the connector is slid into said tube to said connector retention position.

2. A waterproof electrical splice enclosure for receiving a single electrical connector splicing the ends of a plurality of insulated electrical conductors extending out of the connector in the same direction and parallel to one another, comprising:

an elongate hollow tube having one open end and one closed end, the cross-sectional dimensions of the hollow space within said tube in a plane perpendicular to its length being constant along a majority of the length of said tube and only slightly greater then the cross-sectional dimensions of the electrical connector in a plane perpendicular to the length of the insulated electrical conductors extending out of the connector, at least one resilient connector retaining finger extending from the interior wall of said tube into the hollow space within said tube for retaining the electrical connector at a connector retention position adjacent said closed end of said tube with the insulated electrical conductors extending from the connector out of said open end of said tube, said retaining fingers being spaced from said closed end of said tube a distance slightly greater than the length of the connector in a direction parallel to the insulated electrical conductors extending out of the connector to permit the electrical connector to be slid down said tube past said retaining finger, said connector retaining finger being formed to be resiliently depressed by the connector and to resiliently spring back after the connector is slid past it and retain the connector in said closed end of said tube, and a waterproofing fluid within said tube, said waterproofing fluid under normal conditions of use having a sufficient viscosity so that it will not flow out of said tube but being capable of flowing around the connector as it is slid into said tube to said connector retention position adjacent said closed end of said tube to fill the space around the connector and around the between the insulated conductors extending out of the connector to provide a waterproof seal around the spliced ends of the insulated conductors, the length of said hollow space of constant cross-sectional dimensions within said elongate hollow tube being sufficiently greater than the length of the electrical connector to provide a confined space sufficiently long to force said waterproofing fluid to flow around the connector and around and between the insulated conductors as the connector is slid into said tube to said connector retention position.

3. The splice enclosure of claim 2 wherein there are a plurality of said connector retaining fingers spaced around said tube.

4. A waterproof electrical splice enclosure for receiving a single electrical connector splicing the ends of a plurality of insulated electrical conductors extending out of the connector in the same direction and parallel to one another, comprising:

an elongate hollow tube having one open end and one closed end, the cross-sectional dimensions of the hollow spaced within said tube in a plane perpendicular to its length being constant along a majority of the length of said tube and only slightly greater than the cross-sectional dimensions of the electrical connector in a plane perpendicular to the length of the insulated electrical conductors extending out of the connector, means for retaining the electrical connector at a connector retention position adjacent said closed end of said tube with the insulated electrical conductors extending from the connector out of said open end of said tube, and a waterproofing fluid within said tube, said waterproofing fluid under normal conditions of use having a sufficient viscosity so that it will not flow out of said tube but being capable of flowing around the connector as it is slid into said tube to said connector retention position adjacent said closed end of said tube to fill the space around the connector and around and between the insulated conductors extending out of the connector to provide a waterproof seal around the spliced ends of the insulated conductors, and a plurality of ribs formed on the interior wall of said tube, said ribs extending longitudinally of said tube and being spaced around said tube to center the connector as it is slid into said tube to aid in causing said waterproofing fluid to flow around the entire connector as it is slid into said tube, the length of said hollow space of constant cross-sectional dimensions within said elongate hollow tube being sufficiently greater than the length of the electrical connector to provide a confined space sufficiently long to force said waterproofing fluid to flow around the connector and around and between the insulated conductors as the connector is slid into said tube to said connector retention position.

5. A waterproof electrical splice enclosure for receiving a single electrical connector splicing the ends of a plurality of insulated electrical conductors extending out of the connector in the same direction and parallel to one another, comprising:

an elongate hollow tube having one open end and one closed end, the cross-sectional dimensions of the hollow space within said tube in a plane perpendicular to its length being constant along a majority of the length of said tube and only slightly greater than the cross-sectional dimensions of the electrical connector in a plane perpendicular to the length of the insulated electrical conductors extending out of the connector, means for retaining the electrical connector at a connector retention position adjacent said closed end of said tube with the insulated electrical conductors extending from the connector out of said open end of said tube, a cap for closing said open end of said tube after the connector and the spliced ends of the insulated electrical conductors have been inserted into said tube, and a waterproofing fluid within said tube, said waterproofing fluid under normal conditions of use having a sufficient viscosity so that it will not flow out of said tube but being capable of flowing around the connector as it is slid into said tube to said connector retention position adjacent said closed end of said tube to fill the space around the connector and around and between the insulated conductors extending out of the connector to provide a waterproof seal around the spliced ends of the insulated conductors, the length of said hollow space of constant cross-sectional dimensions within said elongate hollow tube being sufficiently greater than the length of the electrical conductor to provide a confined space sufficiently long to force said waterproofing fluid to flow around the connector and around and between the insulated conductors as the connector is slid into said tube to said connector retention position.

6. The splice enclosure of claim 5 wherein said tube and said cap are a one-piece plastic molding, said cap being hinged to said tube and said cap and said tube being formed with complementary latching members for latching said cap closed over said open end of said tube.

7. The splice enclosure of claim 5 wherein said open end of said tube is formed with a broadened entrance area having at least one insulated conductor receiving channel leading into said open end of said tube.

8. The splice enclosure of claim 7 wherein said broadened entrance area has two opposed insulated conductor receiving channels converging into said open end of said tube.

9. The splice enclosure of claim 1 wherein said hollow space within said tube is cylindrical.

10. An electrical connector and a waterproof electrical splice enclosure, comprising:
    a single electrical connector for splicing the ends of a plurality of insulated electrical conductors to be received in said connector and to extend out of said connector in the same direction and parallel to one another, and
    a waterproof electrical splice enclosure, comprising:
        an elongate hollow tube having one open end and one closed end, the cross-sectional dimensions of the hollow space within said tube in a plane perpendicular to its length being constant along a majority of the length of said tube and only slightly greater than the cross-sectional dimensions of said electrical connector in a plane perpendicular to the length of insulated electrical conductors extending out of said connector,
    means for retaining said electrical connector at a connector retention position adjacent said closed end of said tube with insulated electrical conductors extending from said connector out of said open end of said tube, and
    a waterproofing fluid within said tube, said waterproofing fluid under normal conditions of use having a sufficient viscosity so that it will not flow out of said tube but being capable of flowing around said connector as it is slid into said tube to said connector retention position adjacent said closed end of said tube to fill the space around said connector and around and between insulated conductors extending out of said connector to provide a waterproof seal around said connector and the spliced ends of the insulated conductors,
    the length of said hollow space of constant cross-sectional dimensions within said elongate hollow tube being sufficiently greater than the length of said electrical connector to provide a confined space sufficiently long to force said waterproofing fluid to flow around said connector and around and between the insulated conductors as said connector is slid into said tube to said connector retention position.

11. The connector and splice enclosure of claim 10 wherein said means for retaining said electrical connector adjacent said closed end of said tube comprises at least one resilient connector retaining finger extending from the interior wall of said tube into the hollow space within said tube, said retaining finger being spaced from said closed end of said tube a distance slightly greater than the length of said connector in a direction parallel to insulated electrical conductors extending out of said connector to permit said electrical connector to be slid down said tube past said retaining finger, said connector retaining finger being formed to be resiliently depressed by said connector and to resiliently spring back after said connector is slid past it and retain said connector in said closed end of said tube.

12. The connector and splice enclosure of claim 11 wherein there are a plurality of said connector retaining fingers spaced around said tube.

13. The connector and splice enclosure of claim 10 wherein a plurality of ribs are formed on the interior wall of said tube, said ribs extending longitudinally of said tube and being spaced around said tube to center said connector as it is slid into said tube to aid in causing said waterproofing fluid to flow around the entire connector as it is slid into said tube.

14. The connector and splice enclosure of claim 10 including a cap for closing said open end of said tube after said connector and the spliced ends of the insulated electrical conductors extending therefrom have been inserted into said tube.

15. The connector and splice enclosure of claim 14 wherein said tube and said cap are a one-piece plastic molding, said cap being hinged to said tube and said cap and said tube being formed with complementary latching members for latching said cap closed over said open end of said tube.

16. The connector and splice enclosure of claim 14 wherein said open end of said tube is formed with a broadened entrance area having at least one insulated conductor receiving channel leading into said open end of said tube.

17. The connector and splice enclosure of claim 16 wherein said cap is formed on one surface with a bulbous protrusion to fit into said open end of said tube, said bulbous protrusion being deformable by any insulated conductors in said insulated conductor receiving channel.

18. The connector and splice enclosure of claim 17 wherein said tube and said cap are a one-piece plastic molding, said cap being hinged to said tube and said cap and said tube being formed with complementary latching members for latching said cap closed over said open end of said tube.

19. The connector and splice enclosure of claim 16 wherein said broadened entrance area has two opposed insulated conductor receiving channels converging into said open end of said tube.

20. The connector and splice enclosure of claim 19 wherein said cap is formed on one surface with a bulbous protrusion to fit into said open end of said tube, said bulbous protrusion being deformable by any insulated conductors in said insulated conductor receiving channels.

21. The connector and splice enclosure of claim 20 wherein said tube and said cap are a one-piece plastic molding, said cap being hinged to said tube and said cap and said tube being formed with complementary latching members for latching said cap closed over said open end of said tube.

22. The connector and splice enclosure of claim 10 wherein said hollow space within said tube is cylindrical.

23. The connector and splice enclosure of claim 10 wherein said electrical connector has an insulative outer shell within which is a metal coupler for splicing the ends of the insulated electrical conductors.

24. A waterproof electrical splice, comprising:
    a plurality of insulated electrical conductors,
    a single electrical connector splicing the ends of said plurality of insulated electrical conductors extending out of said connector in the same direction and parallel to one another; and a waterproof electrical splice enclosure, said splice enclosure comprising, an elongate hollow tube having one open end and one closed end, the cross-sectional dimensions of the hollow space within said tube in a plane perpendicular to its length being constant along a majority of the length of said tube and only slightly greater than the cross-sectional dimensions of said electrical connector in a plane perpendicular to the length of said insulated electrical conductors extending out of said connector, means retaining said electrical connector at a connector retention position adjacent said closed end of said tube with said insulated electrical conductors extending from said connector out of said open end of said tube, and a waterproofing fluid within said tube, said waterproofing fluid under normal conditions of use having a sufficient viscosity so that it will not flow out of said tube but being capable of flowing around said connector as it is slid into said tube to said connector retention position adjacent said closed end of said tube to fill the space around said connector and around and between said insulated conductors extending out of said connector to provide a waterproof seal around said connector and the spliced ends of said insulated conductors, the length of said hollow space of constant cross-sectional dimensions within said elongate hollow tube being sufficiently greater than the length of said electrical conductor to provide a confined space sufficiently long to force said waterproofing fluid to flow around said connector and around and between said insulated conductors as said connector is slid into said tube to said connector retention position.

25. The waterproof electrical splice of claim 24 wherein said electrical connector has an insulative outer shell within which is a metal coupler splicing the ends of the insulated electrical conductors.

26. The waterproof electrical splice of claim 24 wherein said means retaining said electrical connector adjacent said closed end of said tube comprises at least one resilient connector retaining finger extending from the interior wall of said tube into the hollow space within said tube, said retaining finger being spaced from said closed end of said tube a distance slightly greater than the length of said connector in a direction parallel to said insulated electrical conductors extending out of said connector to permit said electrical connector to be slid down said tube past said retaining finger, said connector retaining finger being formed to be resiliently depressed by said connector and to resiliently spring back after said connector is slid past it and retain said connector in said closed end of said tube.

27. The waterproof electrical splice of claim 26 wherein there are a plurality of said connector retaining fingers spaced around said tube.

28. The waterproof electrical splice of claim 24 wherein a plurality of ribs are formed on the interior wall of said tube, said ribs extending longitudinally of said tube and being spaced around said tube to center said connector as it is slid into said tube to aid in causing said waterproofing fluid to flow around the entire connector as it is slid into said tube.

29. The waterproof electrical splice of claim 24 including a cap for closing said open of said tube after said connector and the spliced ends of said insulated electrical conductors extending therefrom have been inserted into said tube.

30. The waterproof electrical splice of claim 29 wherein said tube and said cap are a one-piece plastic molding, said cap being hinged to said tube and said cap and said tube being formed with complementary latching members for latching said cap closed over said open end of said tube.

31. The waterproof electrical splice of claim 29 wherein said electrical connector has an insulative outer shell within which is a metal coupler splicing the ends of the insulated electrical conductors.

32. A waterproof electrical splice, comprising:
a plurality of insulated electrical conductors,
a single electrical connector splicing the ends of said plurality of insulated electrical conductors extending out of said connector in the same direction and parallel to one another, and
a waterproof electrical splice enclosure, said splice enclosure comprising, an elongate hollow tube having one open end and one closed end, the cross-sectional dimensions of the hollow space within said tube in a plane perpendicular to its length being constant along a majority of the length of said tube and only slightly greater than the cross-sectional dimensions of said electrical connector in a plane perpendicular to the length of said insulated electrical conductors extending out of said connector, said open end of said tube being formed with a broadened entrance area having at least one insulated conductor receiving channel leading into said open end of said tube, a cap for closing said open end of said tube after said connector and the spliced ends of said insulated electrical conductors extending therefrom have been inserted into said tube, means retaining said electrical connector at a connector retention position adjacent said closed end of said tube with said insulated electrical conductors extending from said connector out of said open end of said tube, and a waterproofing fluid within said tube, said waterproofing fluid under normal conditions of use having a sufficient viscosity so that it will not flow out of said tube but being capable of flowing around said connector as it is slid into said tube to said connector retention position adjacent said closed end of said tube to fill the space around said connector and around and between said insulated conductors extending out of said connector to provide a waterproof seal around said connector and the spliced ends of said insulated conductors, the length of said hollow space of constant cross-sectional dimensions within said elongate hollow tube being sufficiently greater than the length of said electrical connector to provide a confined space sufficiently long to force said waterproofing fluid to flow around said connector and around and between said insulated conductors as said conductor is slid into said tube to said connector retention position.

33. The waterproof electrical splice of claim 32 wherein said insulated conductors are sufficiently stiff to permit them to be grasped at a point spaced from said electrical connector and pushed on to slide said electrical connector into and down said tube into said waterproofing fluid, said means retaining said connector comprises a bulbous protrusion formed on one surface of said cap and fitting into said open end of said tube, said bulbous protrusion pressing against at least one of said insulated conductors in said insulated conductor receiving channel.

34. The waterproof electrical splice of claim 33 wherein said bulbous protrusion is deformed by said insulated conductors against which it presses.

35. The waterproof electrical splice of claim 33 wherein said tube and said cap are a one-piece plastic molding, said cap being hinged to said tube and said cap and said tube being formed with complementary latching members for latching said cap closed over said open end of said tube.

36. The waterproof electrical splice of claim 32 wherein said broadened entrance area has two opposed insulated conductor receiving channels converging into said open end of said tube.

37. The waterproof electrical splice of claim 36 wherein said insulated conductors are sufficiently stiff to permit them to be grasped at a point spaced from said electrical connector and pushed on to slide said electrical connector into and down said tube into said waterproofing fluid, said means retaining said connector comprises a bulbous protrusion formed on one surface at said cap and fitting into said open end of said tube, said bulbous protrusion pressing against at least one of said insulated conductors in said insulated conductor receiving channels.

38. The waterproof electrical splice of claim 37 wherein said bulbous protrusion is deformed by said insulated conductors against which it presses.

39. The waterproof electrical splice of claim 37 wherein said tube and said cap are a one-piece plastic molding, said cap being hinged to said tube and said cap and said tube being formed with complementary latching members for latching said cap closed over said open end of said tube 40. The waterproof electrical splice of claim 32 wherein said means retaining said electrical connector adjacent said closed end of said tube comprises at least one resilient connector retaining finger extending from the interior wall of said tube into the hollow space within said tube, said retaining finger being spaced from said closed end of said tube a distance slightly greater than the length of said connector in a direction parallel to said insulated electrical conductors extending out of said connector to permit said electrical connector to be slid down said tube past said retaining finger, said connector retaining finger being formed to be resiliently depressed by said connector and to resiliently spring back after said connector is slid past it and retain said connector in said closed end of said tube.

41. The waterproof electrical splice of claim 32 wherein said hollow space within said tube is cylindrical.

42. The waterproof electrical splice of claim 32 wherein said electrical connector has an insulative outer shell within which is a metal coupler splicing the ends of the insulated electrical conductors.

43. A method for waterproofing an electrical connection consisting of a plurality of insulated electrical conductors and a single electrical connector splicing the ends of the insulated conductors with the insulated conductors extending out of the connector in the same direction and parallel to one another, comprising:
providing a waterproof electrical splice enclosure, comprising:
an elongate hollow tube having one open end and one closed end, the cross-sectional dimensions of the hollow space within said tube in a plane perpendicular to its length being constant along a majority of the length of said tube and only slightly greater than the cross-sectional dimensions of said electrical connector in a plane perpendicular to the length of said insulated electrical conductors extending out of said connector,
a waterproofing fluid within said tube, said waterproofing fluid under normal conditions of use having a sufficient viscosity so that it will not flow out of said tube but being capable of flowing around said connector as it is slid into said tube to fill the space around said connector and around and between said insulated conductors extending out of said connector to provide a waterproof seal around said connector and the spliced ends of said insulated conductors,
the length of said hollow space of constant cross-sectional dimensions within said elongate hollow tube being sufficiently greater than the length of said electrical connector to provide a confined space sufficiently long to force said waterproofing fluid to flow around said connector and around and between said insulated conductors as said connector is slid into said tube; and
inserting the connector and the spliced ends of the insulated electrical conductors into said open end of said elongate hollow tube and sliding them into said tube until said waterproofing fluid flows around said connector and around and between said insulated conductors.

44. The method of claim 43 wherein said step of inserting and sliding said connector and the spliced ends of the insulated conductors comprises sliding said connector to a connector retention position; and there is included the step of retaining said electrical connector at said connector retention position.

* * * * *